United States Patent

Dalal et al.

[11] Patent Number: 5,892,891
[45] Date of Patent: Apr. 6, 1999

[54] SYSTEM FOR PRINTING COLOR IMAGES WITH EXTRA COLORANTS IN ADDITION TO PRIMARY COLORANTS

[75] Inventors: Edul N. Dalal; Thyagarajan Balasubramanian; R. Victor Klassen, all of Webster, N.Y.

[73] Assignee: Xerox Corporation, Stamford, Conn.

[21] Appl. No.: 753,131

[22] Filed: Nov. 20, 1996

[51] Int. Cl.[6] .................................................... H04N 1/50
[52] U.S. Cl. ........................ 395/109; 382/162; 358/536
[58] Field of Search ................................. 382/162–167; 358/515–518, 540; 395/109

[56] References Cited

U.S. PATENT DOCUMENTS

| | | | |
|---|---|---|---|
| 4,275,413 | 6/1981 | Sakamoto et al. | 358/80 |
| 4,500,919 | 2/1985 | Schreiber | 358/78 |
| 4,812,899 | 3/1989 | Kueppers | 358/75 |
| 4,893,179 | 1/1990 | Ito | 358/79 |
| 5,047,844 | 9/1991 | Ikeda et al. | 358/80 |
| 5,077,604 | 12/1991 | Kivolowitz et al. | 358/75 |
| 5,087,126 | 2/1992 | Pochieh | 356/402 |
| 5,136,372 | 8/1992 | Nakatani et al. | 358/80 |
| 5,140,411 | 8/1992 | Haneda et al. | 358/75 |
| 5,208,663 | 5/1993 | Hiratsuka et al. | 358/75 |
| 5,510,910 | 4/1996 | Borkman et al. | 358/502 |
| 5,528,386 | 6/1996 | Rolleston et al. | 358/522 |
| 5,734,800 | 3/1998 | Herbert et al. | 395/109 |

OTHER PUBLICATIONS

Ostromoukhov "Chromaticity Gamut Enhancement by Heptatone Multi–Color Printing," SPIE, vol. 1909, p. 139, Jun., 1993.

Boll, "A Color to Colorant Transformation for a Seven Ink Process," presented at the IS&T–SPIE Symposium on Electronic Imaging, Science and Technology, Feb., 1994.

"New Era of Digital Photo Printing . . . " Hard Copy Observer, Oct. 1996, p. 1, and its ancillary articles.

*Primary Examiner*—Thomas D. Lee
*Assistant Examiner*—Stephen Brinich
*Attorney, Agent, or Firm*—R. Hutter

[57] ABSTRACT

In a "hi-fi" color printing system, wherein colorants of hi-fi colors beyond the regular CMYK primary colorants are available, a main gamut obtainable with the CMYK colorants only is mutually exclusive with at least one extended gamut in which a hi-fi colorant is used and a complementary one of the CMY colorants is excluded. Because the main and extended gamuts are mutually exclusive, no more than four colorants are used in any part of the image, and no more than four halftone screens need be used to obtain any desired color.

12 Claims, 3 Drawing Sheets

SYSTEM FOR PRINTING COLOR IMAGES WITH EXTRA COLORANTS IN ADDITION TO PRIMARY COLORANTS

FIELD OF THE INVENTION

The present invention relates to digital printing systems, in which images based on electronic image signals are printed. More specifically, the present invention relates to what are sometimes known as "hi-fi" electronic color printing systems, in which a range of possible colors are formed by more than the typical three primary colors and black.

BACKGROUND OF THE INVENTION

FIG. 1 represents a representative "slice" of color space in the visible spectrum, showing the additive and subtractive primary colors. (As is known in the art of color science, the slice illustrated in FIG. 1 is a section of a three-dimensional color space, with a white-to-black neutral axis emerging from the center of the diagram out of the page.) Around the perimeter of the section of color space are shown locations representing a full saturation of the subtractive primary colors yellow (Y), magenta (M), and cyan (C). These subtractive colors, as is well known, are used in the printing of images, because combinations of these colors can theoretically simulate all other colors in the visible spectrum.

Located between the various pairs of subtractive primary colors in the color space are what are here called the "hi-fi colors," blue (B), red (R), and green (G). As can be seen in the Figure, each hi-fi color can theoretically be simulated by combining, such as on a printed surface, colorants (such as toner or ink) of the two adjacent primary colors, so that magenta plus cyan together on a printed sheet would yield blue, while cyan and yellow would produce green, and so forth. However, particularly in the field of xerography, where images are typically formed with dry powders which are fused onto a paper sheet, this theoretical mixing of primary colors to yield other colors may result in a limited printer gamut. The inevitable chemical shortcomings of typical toner compositions will often cause combinations of primary color toner to yield a sub-optimal rendering of the desired combination color.

Within the shape shown in the Figure, wherein colors of any kind will be more vivid (i.e., have higher chroma) as one approaches the perimeter, the shaded area bounded by solid curved lines represents a typical practical gamut of colors obtainable with the printing apparatus. If it is attempted to print one of the primary colors, such as yellow, yellow toner is simply applied to the sheet, unalloyed with any other color; in such a case, pure yellow toner will yield the theoretical maximum chrominance of the desired color. This optimal use of uncombined primary color is represented by the fact that the solid curved line within the shape meets the perimeter of the shape only at the point of pure color, when yellow toner is not combined with any magenta or cyan toner.

However, if it is desired, for example, to print a green area, there must be a supplied onto the paper a visually-effective combination (either dots next to dots, or one toner layer on another) of yellow with cyan. As long as one primary color dominates, almost optimal chrominance can be achieved, as is shown by the fact that the curved solid line is reasonably close to the shape when yellow or cyan dominates. When colors toward a pure green are desired, which would require close to a half-and-half split of the two types of toner, the lack of chrominance becomes noticeable, as shown in the Figure by the fact that, near the area marked G, the solid curved line is quite far from the corner of the shape which represents a perfect green. In practical terms, the fact that the solid curved line is far from the perimeter of the shape results in a distinct dull or grayish appearance when the combination color is attempted. A similar lack of chrominance will appear when other hi-fi hues, such as red or blue, are attempted to be printed with close-to-equal proportions of subtractive colors.

It has been proposed, particularly in the art of xerographic printing, to overcome the problem of obtaining the hi-fi hues by providing printing apparatus which lays down not only the CMY primary colors, but also one or more apparatus (such as development units) which lay down one or more types of toner to print hi-fi hues, such as RGB. Instead of trying to obtain, for example, pure blue by mixing magenta and cyan toners, such a system would simply lay down a dedicated blue toner. With the addition of a black (K) development unit such as for printing of text, such "hi-fi" color printing systems would typically include five or more development units.

DESCRIPTION OF THE PRIOR ART

In the prior art, U.S. Pat. No. 4,275,413 discloses a linear interpolation method for locating outputs of a three-dimensional look-up table, such as to convert a desired color from RGB to CMY color space.

U.S. Pat. No. 4,500,919 discloses a basic technique for obtaining a specific desired color from signals representative of various primary colors.

U.S. Pat. No. 4,812,899 discloses a printing technique in which the picture surface is divided into subsurfaces of identical size, with every subsurface divided into juxtaposed elemental surfaces which form a chromatic component and a achromatic component. The elemental surfaces which form the chromatic component are printed with a maximum of two of six chromatic printing inks, such as yellow, orange-red, magenta-red, violet-blue, cyan-blue, green and black.

U.S. Pat. No. 4,893,179 discloses a digital copier including a decomposing circuit for decomposing a color image into three fundamental colors. The original RGB data derived from the original decomposition is then converted to CMYK data for xerographically printing the image.

U.S. Pat. No. 5,047,844 discloses a color printing apparatus in which an edge portion of an achromatic area is detected to emphasize the edge portion and reduce the density of a chromatic area near the edge portion. This technique results in a reduction of color bleeding.

U.S. Pat. No. 5,077,604 discloses a method for converting RGB color separation signals into an equivalent CMYK image signals.

U.S. Pat. No. 5,087,126 discloses a method of estimating a combination of fundamental colors which corresponds to a target color desired to be printed.

U.S. Pat. No. 5,136,372 discloses a color xerographic printer. A spatial frequency detector detects a spatial frequency relating to an image of a prescribed color for every portion of an image to be formed. The images are formed with different xerographic techniques, depending on whether there is high spatial frequency of the image desired to be printed.

U.S. Pat. No. 5,140,411 discloses a color image reader, in which light from the original image is divided, by means of a prism, into separate components which can be fed to a discriminator for discriminating between a chromatic portion of the light image and an achromatic portion of the light image.

U.S. Pat. No. 5,208,663 discloses an image processing apparatus in which color image data is classified as including either an achromatic color, a chromatic color, or an intermediate color. The apparatus further includes a discrimination circuit for discriminating a kind of the original image on the basis of the color image data, with a classifying circuit being capable of changing the classifying criterion in accordance with the discriminated kind of the original image.

U.S. Pat. No. 5,510,910 discloses a technique of merging color signals to map control signals for a CRT through a common perceptual space into printer control signals.

U.S. Pat. No. 5,528,386 describes an apparatus for taking an original RGB image and converting the signals therefrom to a CMYK image which can be fed to a printing apparatus.

Ostromoukhov, "Chromaticity Gamut Enhancement by Heptatone Multi-Color Printing," SPIE, Volume 1909, page 139, June, 1993, gives an overview of the basic techniques of extending a CMYK printing process to a CMYKRGB printing process.

Boll, "A Color to Colorant Transformation for a Seven Ink Process," presented at the IS&T-SPIE Symposium on Electronic Imaging, Science and Technology, February 1994, discloses the selection of primary color to obtain desired color in a CMYKRGB apparatus. The disclosed technique subdivides the gamut formed by the seven possible colorants into smaller groupings. A series of four-colorant subsets from the seven-ink superset of CMYKRGB are individually characterized and a colorimetric transform was obtained for each subset. In color space each of the four-colorant subsets represent adjacent and overlapping subgamuts of the seven-colorant gamut.

The article "New Era of Digital Photo Printing . . .", *Hard Copy Observer*, October 1996, p.1, and its ancillary articles, discloses currently popular techniques for gamut enhancement, particularly in regard to ink-jet printing. Among these techniques are using primary color inks of different densities (e.g. a dark cyan ink and a light cyan ink), or adding orange and green primary inks (this is known as the Pantone "hexachrome" system).

SUMMARY OF THE INVENTION

According to one aspect of the present invention, there is provided, in a printing apparatus capable of printing a desired color as a combination of a set of colorants, a method of selecting colorants for printing a desired color. Combinations of colorants comprising at least a first colorant, second colorant, and third colorant are defined as a main gamut, the main gamut substantially evenly surrounding an origin in device-independent color space. An extended gamut is defined as including colors printable with a fourth colorant combined with at least the first colorant but excluding the second colorant. A desired color in the main gamut is printed with the first colorant and second colorant, and a desired color in the extended gamut is printed with the first colorant and the fourth colorant but excluding the second colorant.

According to another aspect of the present invention, there is provided, in a printing apparatus capable of printing a desired color as a combination of a set of colorants, a method of selecting colorants for printing a desired color. Combinations of CMY colorants are defined as a main gamut. An extended gamut is defined as including colors printable with a non-CMY hi-fi colorant combined with at least a first CMY colorant and excluding a second CMY colorant. A desired color in the main gamut is printed with the CMY colorants, and a desired color in the extended gamut is printed with the hi-fi colorant and at least a first CMY colorant and excluding a second CMY colorant.

DETAILED DESCRIPTION OF THE INVENTION

Figure 4:
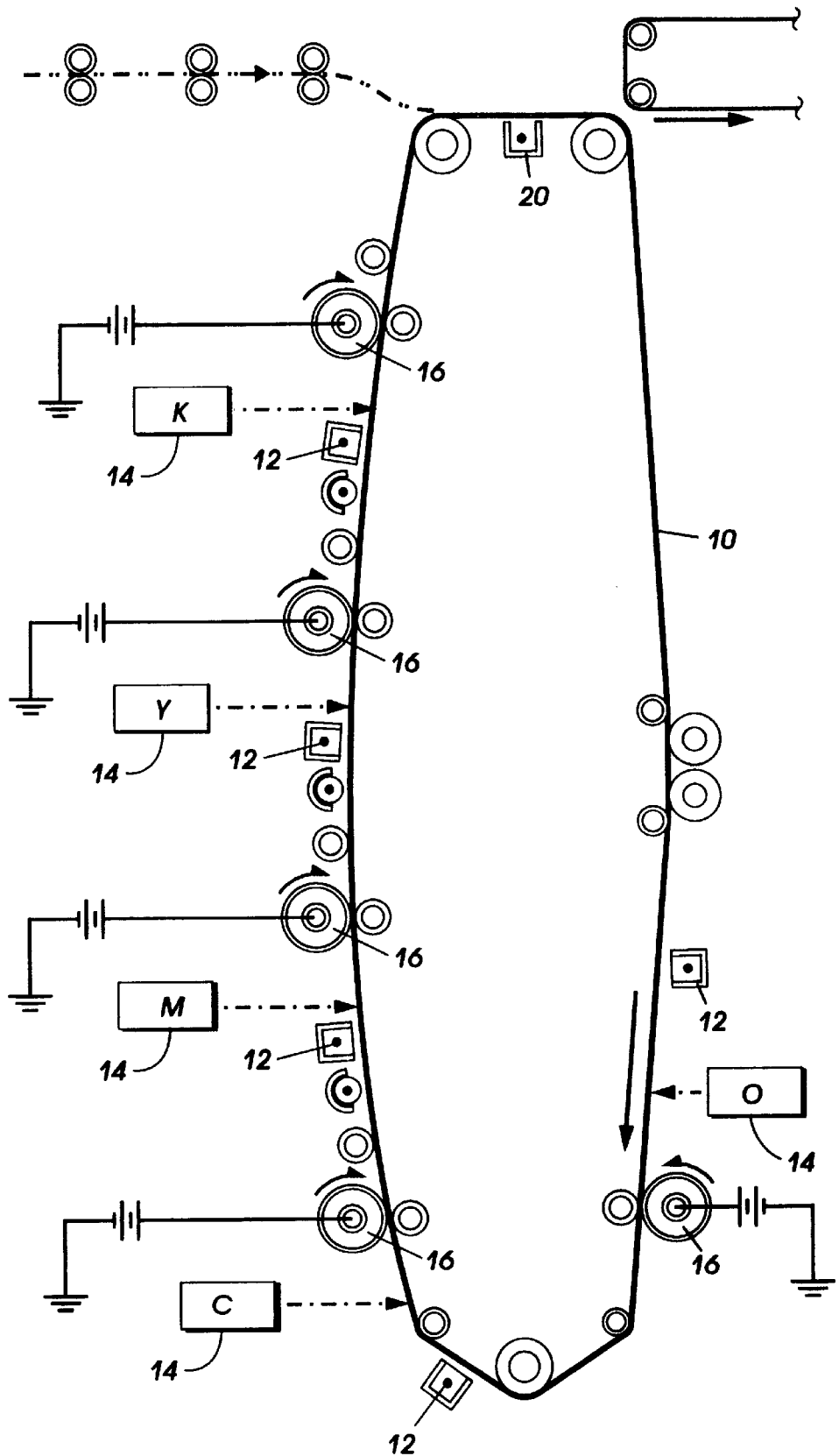
FIG. 4 is a simplified elevational view showing the essential portions of a xerographic engine suitable for image-on-image printing of full-color images.

FIG. 4 is a simplified elevational view showing the essential portions of a xerographic engine suitable for image-on-image printing of full-color images. (Although one embodiment of the invention involves printing an image using image-on-image xerography as will be described, the claimed methods can be applied to any color printing system, including ink-jet, lithography, etc.) In the particular architecture shown in FIG. 4, a series of development units successively lay down different primary-colored toners on a single photoreceptor, and the accumulated different-colored toners are then transferred to a print sheet, such as a sheet of paper. As shown in the Figure, a photoreceptor belt 10 is entrained around a series of rollers, and along the circumference of the photoreceptor belt 10 are disposed a series of charge corotrons, each indicated as 12, exposure devices indicated as 14, which, as known in the art, could comprise for example an independent laser scanner or LED print bar, and developing apparatus, such as charged donor rolls 16, which apply appropriately-charged toner to the suitably charged or discharged areas created by exposure devices 14. A person of skill in the art of xerographic printing will appreciate that each combination of charge corotron 12, exposure device 14, and development unit 16 along the circumference of photoreceptor 10 represents an "imaging station" capable of placing toner of a particular primary or other color in imagewise fashion on the photoreceptor 10. The location of where these colors are to be placed will, of course, be determined by the various areas discharged by the series of exposure devices 14. There may also be, disposed along photoreceptor belt 10, any number of ancillary devices, such as cleaning corotrons, cleaning blades, etc., as would be known to one of skill in the art. By causing a particular image area on the photoreceptor belt 10 to be processed by a number of stations, each station corresponding to one primary color, it is apparent that a full-color image, comprising imagewise-placed toners of the different primary colors, will eventually be built-up on photoreceptor 10. This built-up full-color image is then transferred to a print sheet, such as at transfer corotron 20, and then the print sheet is fused to fix the full-color image thereon.

Figure 1:
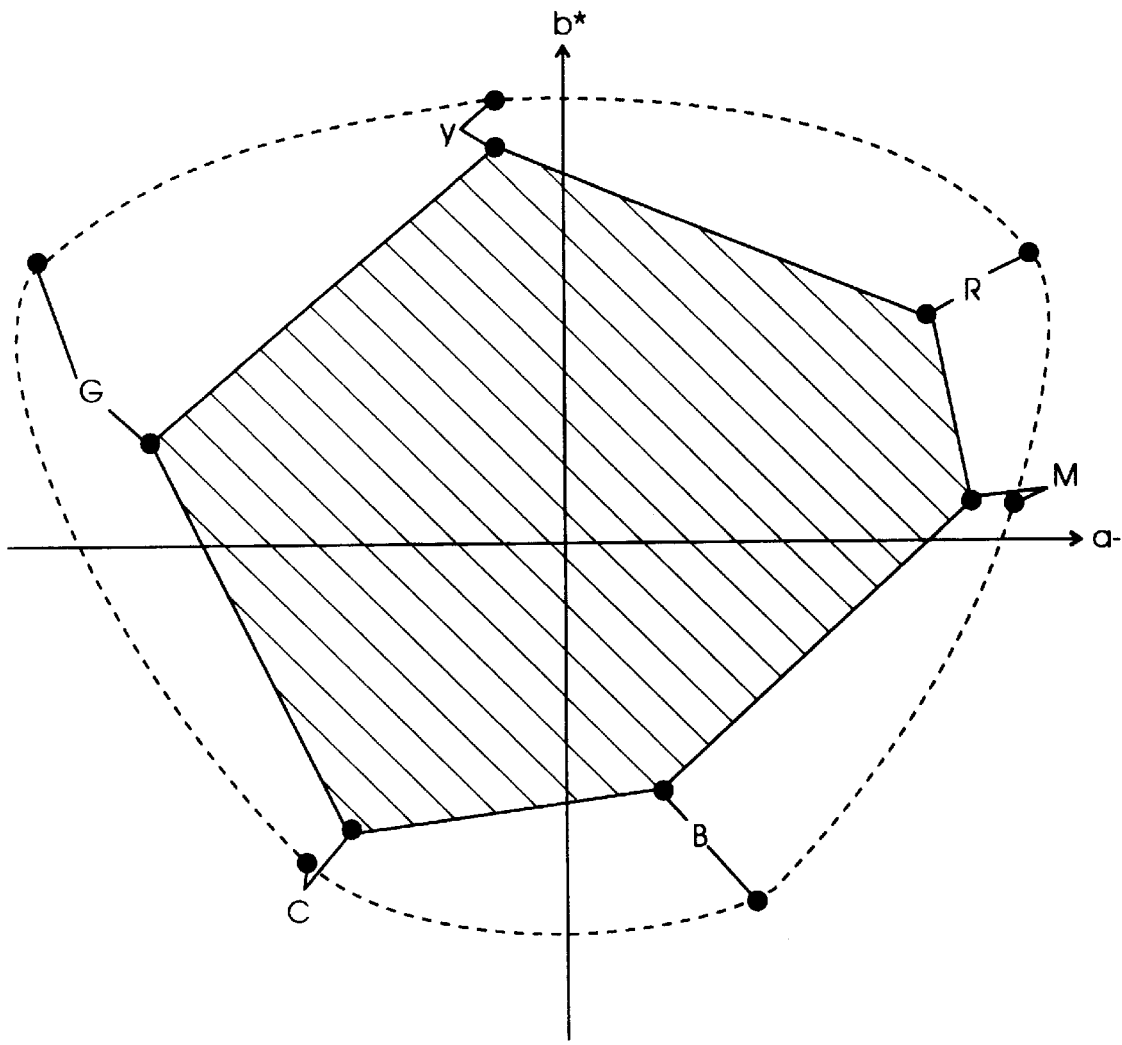
FIG. 1 shows a representative section of color space illustrating a principle of "hi-fi" color according to the present invention.

In a "hi-fi" full-color printing system, an example of which is shown in the Figure, there are provided, in addition to the various primary-color imaging stations indicated as C, M, Y, and K, one or more additional imaging stations; in a full hi-fi color system, there would be seven such imaging stations, consisting of not only the CMYK imaging stations, but three additional imaging stations for the RGB colors as well. In a proposed design for a hi-fi color printer, because of empirical studies of the nature of color documents that are typically desired to be printed, it has often been found that a useful design choice is to provide, as one of the additional colors, toner of closer to an orange color than red, such as indicated by the spot marked O in FIG. 1, which as can be seen is placed between red and yellow in color space.

Figure 2:
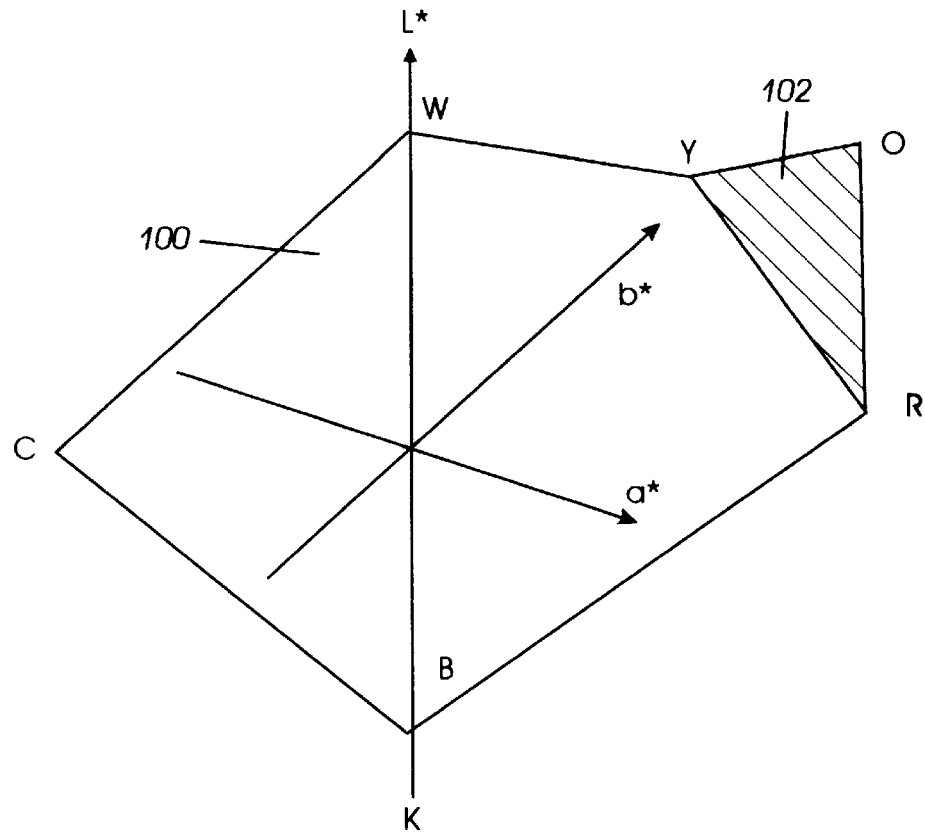
FIG. 2 shows an approximation of main and extended gamuts, according to the present invention, in three-dimensional CIE-L*a*b* color space.

FIG. 2 is a rendering of a typical gamut obtainable with a printing apparatus such as shown in FIG. 4, rendered in three-dimensional CIE-L*a*b* space. The specific shape of the gamut will of course vary depending on a particular printing apparatus, and so is rendered only in rough terms in FIG. 2. The various capital letters in FIG. 2 indicate the locations of identifiable color in the outer surface of the gamut, while the axes of the color space are shown in italics. In general, the gamut extends from black (K) to white (W) along the L* axis, from green (G) to red (R) along the a* axis, and from blue (B) to yellow (Y) along the b* axis. The volume compassed by the gamut indicates all of the possible colors which are obtainable by combining one or more primary colors such as CMYK. It will be noted that, particularly in a CMYK system, the same specific color (represented by a given location within the gamut) can be obtained by multiple different combinations of primary colorants such as CMYK.

In a "hi-fi" digital printing system having more than the typical CMYK colorants available, such as the CMYKO system shown in FIG. 4, the presence of the extra colorant, in this case orange (O), will have the effect of substantially extending the volume of the gamut of colors which may be printed with the printing apparatus. (The specific color of a hi-fi colorant is often a matter of a design choice, taking into account what specific hi-fi color most usefully expands the volume of the total gamut; with current printer designs, the most useful single hi-fi colorant tends to be in the red to orange range.) According to the present invention, if the gamut of colors achievable where the CMYK colorant in a particular printing apparatus is defined as a main gamut 100, the additional volume provided to the gamut by the availability of a hi-fi or "hi-fi" colorant such as orange (O) can be defined as an extended gamut, here indicated as 102. Extended gamut 102 thus represents all of the additional capability provided specifically by a particular "hi-fi" colorant.

According to the present invention, a particular color which is desired to be printed, which may originate, for example, in the RGB signals of a hard-copy scanner or which is apparent to a human user in the RGB signals from a CRT, is mapped to a device-independent color space such as L*a*b*. (Although L*a*b* color space is shown, the present invention can be understood in terms of any device-independent color space, such as L*u*v*, or X, Y, Z, as is known in the art.) In the device independent color space, the desired color is determined to be either within the main gamut 100 or in the extended gamut 102. Specifically, according to the present invention, if the desired color to be printed is located within main gamut 100, only CMYK colorants are used. This rule holds even if, by coincidence, a color located within the main gamut 100 is also obtainable by further combining the hi-fi color; as mentioned above, various regions within a gamut in device-independent color space can often be obtained with multiple combinations of different colorants. Simultaneously, according to the present invention, colors desired to be printed which are located within the extended gamut 102 are always printed with the hi-fi colorant, such as orange, and preferably with the exclusion of the color forming the main gamut 100 which is complementary to the hi-fi color. In the case shown in FIG. 2, the CMYK (main gamut) colorant which is complementary to orange (the hi-fi colorant) is cyan; therefore, a color desired to be printed which is located in gamut 102 is obtained strictly by a combination of two or more colorants MYKO, leaving out cyan (C) completely. In summary, the present invention provides for the main gamut 100 and the extended gamut 102 being mutually exclusive within device-independent color space, so that all colors within main gamut 100 are printed with the CMYK colorants, and all colors within the extended gamut 102 are printed with the MYKO colorants.

It will be noted that the general shape of the main gamut 100 provides a generally even surround of the origin in all octants of L*a*b* space, as shown in FIG. 2. With regard to certain of the claims below, what is important is not that the edges of the gamut are substantially equal in all octants, but rather that the main gamut does not emphasize one distinct set of octants or subset of colorants, such as for example the lobe-like subgamuts shown in the Boll reference cited above. With reference to certain others of the claims herein, a technique for printing with the "CMY colorants" is understood to include a CMYK scheme as well, inasmuch as a CMYK color scheme is typically a CMY scheme with the addition of black undercolor removal, as is known in the art of color printing.

Figure 3:
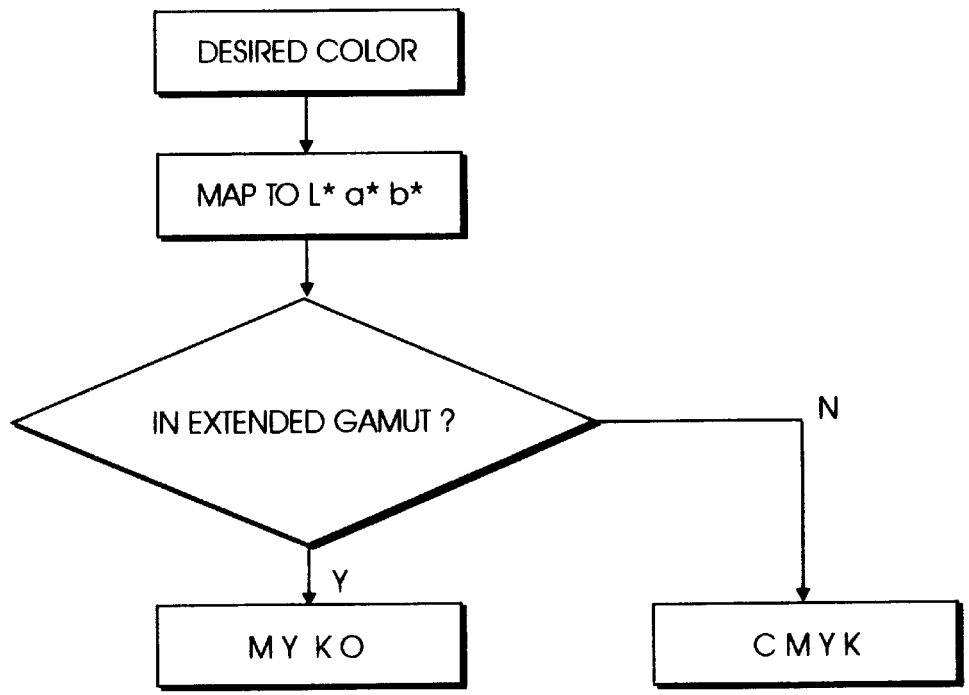
FIG. 3 is a flow-chart illustrating certain aspects of the method of the present invention.

The basic decision tree for carrying out the present invention in the CMYKO color space is shown in FIG. 3. Although the basic method shown in FIG. 3 implies that the decision of whether a desired color is in the main gamut 100 or extended gamut 102 is made "on the fly," in a practical embodiment of the invention, the basic gamut decision can be facilitated by a look-up table for color space conversion, which is consulted as specific colors are desired to be printed. Such a look-up table can convert original RGB signals, such as from a hard-copy scanner or CRT, to CMYK or MYKO signals depending on the specific combination of RGB signals entered therein. Input RGB signals which happen to describe colors in the main gamut 100 result in CMYK outputs, while input RGB signals which happen to describe colors in the extended gamut 102 result in MYKO outputs. Also as generally known in the art, RGB signals which describe colors beyond either the main gamut 100 or extended gamut 102 can be approximated by techniques such as mapping to the point on the surface of the gamut which is closest to the desired color.

It is known in the art, when using look-up tables for color space conversion, that the finite resolution of such look-up tables often requires interpolation between look-up table entries and output values, i.e. if an input RGB signal does not correspond exactly to one or another CMYK or MYKO output value, an interpolated CMYK or MYKO value is interpolated among two or more close outputs. If such interpolation techniques are used, it is possible that the value of a desired color falling close to the interface between main gamut 100 and extended gamut 102, by virtue of the interpolation process, will require both cyan and orange colorants. Although such a situation is strictly speaking contradictory to the claimed invention, such a case should be deemed trivial, and can be remedied by modifications to an interpolation algorithm or to the look-up table itself.

In order to obtain a usable look-up table for operating a CMYKO hi-fi printing apparatus employing the present invention, a general procedure to generate color separation would comprise the following steps:

(a) Use the apparatus to print a set of test patches using a range of combinations of the CMYK colorant, and measure colorimetric values of the patches in device-independent space, such as L*a*b*.

(b) Print a set of test patches using various combinations of the MYKO colorants. Isolate those patches which extend the gamut provided by the CMYK colorants and map those patches in L*a*b* space.

(c) Use a standard interpolation or fitting technique to generate mappings from L*a*b* space to CMYK and MYKO signals which can be used to operate the apparatus. These mappings can be implemented in a 3-dimensional look-up table.

(d) For a given input image to be printed, convert the original image signals, such as RGB, into L*a*b* or similar device-independent coordinates, and then map the L*a*b* coordinates through the look-up table to generate the desired CMYK and MYKO separations.

The mutual exclusivity of the main gamut 100 and extended gamut 102 provides numerous practical advantages. First, if a hi-fi color printing system which had five available colorants such as CMYKO were used, there would have to be provided an arrangement of halftone screens on the print sheet that would accommodate five simultaneous halftone screens, one screen for each colorant. Under the system of the present invention, colors in the main gamut will be printed with a CMYK set of screens, while colors in the extended gamut 102 will be printed with the MYKO set of screens: in either case, only four halftone screens need to be accommodated in a pattern on the printing surface, just as with basic four-color halftone printing. For printing colors in the extended gamut, the locations in the printing area which had been dedicated to the cyan screen for printing in the main gamut are simply substituted with a halftone screen for orange.

Other practical advantages of the system of the present invention include: (1) The color separations which were originally intended for CMYKO or other hi-fi colorant sets will still yield often-acceptable prints when applied to a four-color printing apparatus, so that the same color file could conceivably be printed out on either a hi-fi printer or on a four-color desktop printer. (2) In printing apparatus in which multiple layers of colorant are placed on a single surface, such as toners in a xerographic printer, there will never be more than four layers of colorant placed on a surface, regardless of the particular color desired to be printed. (3) Neutral colors, that is desired colors located near the L* axis such as in FIG. 2, may be rendered with CMYK colorants with less than 100% undercolor removal. This feature is in contrast to, for example, the process described in the Boll reference above, which specifies that neutral colors are reproduced with pure black (K). This may be a desirable feature for xerographic processes, where the black printing apparatus is often noisy, and more pleasing neutrals are obtained with the CMYK colorants; also, this feature allows more gradual transitions to or through neutral colors on a printed sheet, and the availability of extra colorants permits a greater $D_{max}$, or total black, when a CMY colorant is added to a pure black area in an image.

Although the main gamut 100 and extended gamut 102 are shown with a basic hi-fi printing system using only one hi-fi colorant, it is conceivable to extend the principle to a six- or seven-color system, in which there would be up to three distinct extended gamuts, being provided by orange, green, and blue colorants respectively. In such a case, the same principle of mutual exclusivity would exist: As with the basic case, wherein every possible color is printed with cyan or orange but never both, in a seven-color system, colors would be printed with green or magenta but never both, or yellow or blue but never both. At the same time, even with a seven-color system, different four-color sets of halftone screens would be used, each set using the same screen angles for complementary colors (e.g., C=O=−15°, M=G=15°, and Y=B=0°). The method of the present invention can, of course, be applied as well to systems using even more than seven colorants.

According to one embodiment of the present invention, in a digital printing apparatus wherein signals corresponding to each primary color are in the form of 8-bit bytes, data for one or more hi-fi colorants can be accommodated through certain simple techniques with no increase in storage requirements over that of the original CMYK separations. Because it is known in advance that no pixel, according to the present invention, can include both cyan and orange colorants, a single byte can be used to indicate the amount of cyan or orange colorant to be applied to the particular area. According to one technique, whereas the M, Y, and K signals are each 8-bit binary numbers, the datum for either the cyan or orange component of a particular pixel is also in the form of a 8-bit byte, except that the least significant bit of the 8-bit byte is replaced with a "flag" bit, which indicates whether the preceding seven bits in the byte represent cyan or orange. For example, instead of the least significant bit for the cyan or orange component, there can exist a 0 which can be interpreted as indicating that the previous seven bits represent cyan colorant, while a 1 would indicate that the previous seven bits would represent an orange colorant. For a sevencolor system, this principle can be extended, wherein in all cases the least significant bit of a signal is replaced with a bit that indicates whether the signal should represent the basic primary color or the complementary hi-fi color (magenta or green, or yellow or blue). Because only the least significant bit of any signal is affected, the cost of this technique is small in terms of color precision, while allowing the claimed method to operate with no increase in storage or memory incurred by the additional hi-fi color separations.

Alternatively, another technique for retaining image data in an image file, while preserving an 8-bit system, would be to exploit the fact that, particularly in xerographic printing, after color correction and toner-response-curve corrections, providing 256 levels for each color (as would be provided by an 8-bit system) may be excessively precise. It may be suitable, for example to declare 8-bit values between 0–160 as cyan signals from 0 to full chroma, and values between 160–255 as orange signals from 0 to full chroma. This technique accomodates signals of both colors within an 8-bit "slot," and once again enables a full-color image file to require data for only four separations, as the file for one separation serves both the cyan and orange signals. It will be noted that this technique may, in some embodiments, be the equivalent of using the most significant bit of a binary signal as a "flag" bit, as opposed to the least significant bit used in the above-described technique. To retain full color precision, all 8 bits would be used to represent the color value, while a 9th bit would be used to switch between the orange and the cyan. This is still a significant saving over the 16 bits required to separately store the orange and cyan signals. Of course this technique can be extended to a seven-color system, as above.

While the invention has been described with reference to the structure disclosed, it is not confined to the details set forth, but is intended to cover such modifications or changes as may come within the scope of the following claims.

We claim:

1. In a printing apparatus capable of printing a desired color as a combination of a set of colorants, a method of selecting colorants for printing a desired color- comprising the steps of:

defining combinations of colorants comprising at least a first colorant, second colorant, and third colorant as a main gamut, the main gamut substantially evenly surrounding an origin in device-independent color space;

defining an extended gamut as including colors printable with a fourth colorant combined with at least the first colorant but excluding the second colorant;

locating the desired color in a device-independent color space wherein the main gamut does not intersect with the extended gamut, thereby determining whether the desired color is in the main gamut or the extended gamut;

if the desired color is in the main gamut, printing the desired color with at least one colorant selected from a group of colorants including the first colorant and second colorant hut excluding the fourth colorant; and if the desired color is in the extended gamut, printing the desired color with at least one colorant selected from a group of colorants including the first colorant and the fourth colorant hut excluding the second colorant.

2. The method of claim 1, the step of printing a desired color in the main gamut including printing with the first colorant and second colorant but excluding the fourth colorant.

3. The method of claim 1, further including the steps of for printing a desired color in the main gamut, printing a halftone screen of the first colorant and printing a halftone screen of the second colorant oriented at a predetermined angle relative to the halftone screen of the first colorant, and for printing a desired color in the extended gamut, printing a halftone screen of the first colorant and printing a halftone screen of the fourth colorant oriented at said predetermined angle relative to the halftone screen of the first colorant.

4. The method of claim 1, wherein the second colorant is substantially cyan, and the fourth colorant is substantially red to orange.

5. The method of claim 1, further comprising the steps of:

retaining signals representing both the second colorant and fourth colorant, each signal including a plurality of bits, a preselected one of the plurality of bits indicating whether the signal represents the second colorant or the fourth colorant.

6. The method of claim 1, further comprising the steps of:

retaining signals representing both the second colorant and fourth colorant, each signal including a plurality of bits forming a number, the number being within a first range if the signal represents the second colorant, and the number being within a second range if the signal represents the fourth colorant.

7. In a printing apparatus capable of printing a desired color as a combination of colorants, a method of selecting colorants for printing a desired color, comprising the steps of:

defining combinations of CMY colorants as a main gamut;

defining an extended gamut as including colors printable with a non-CMY hi-fi colorant combined with at least a first CMY colorant and excluding a second CMY colorant;

locating the desired color in a device-independent color space wherein the main gamut does not intersect with the extended gamut, thereby determining whether the desired color is in the main gamut or the extended gamut;

if the desired color is located in the main gamut, printing the desired color with at least one colorant selected only from the CMY colorants; and if the desired color is located in the extended gamut, printing the desired color with at least one colorant selected from a group of colorants comprising the hi-fi colorant and excluding the second CMY colorant.

8. The method of claim 7, the step of printing a desired color in the main gamut including printing with at least one CMY colorant but excluding the hi-fi colorant.

9. The method of claim 7, further including the steps of for printing a desired color in the main gamut, printing a halftone screen of the first CMY colorant and printing a halftone screen of a second CMY colorant oriented at a predetermined angle relative to the halftone screen of the first colorant, and for printing a desired color in the extended gamut, printing a halftone screen of the first CMY colorant and printing a halftone screen of the hi-fi colorant oriented at said predetermined angle relative to the halftone screen of the first CMY colorant.

10. The method of claim 7, wherein the second CMY colorant is substantially cyan, and the hi-fi colorant is substantially red to orange.

11. The method of claim 7, further comprising the steps of:

retaining signals representing the second CMY colorant and the hi-fi colorant, each signal including a plurality of bits, a preselected one of the plurality of bits indicating whether the signal represents the second CMY colorant or the hi-fi colorant.

12. The method of claim 7, further comprising the steps of:

retaining signals representing the second CMY colorant and the hi-fi colorant, each signal including a plurality of bits forming a number, the number being within a first range if the signal represents the second CMY colorant, and the number being within a second range if the signal represents the hi-fi colorant.

* * * * *